(12) United States Patent
Manera

(10) Patent No.: US 8,858,215 B2
(45) Date of Patent: Oct. 14, 2014

(54) INJECTION BLOW MOLD MANIFOLD AND NOZZLE

(75) Inventor: David A. Manera, Petersburg, NJ (US)

(73) Assignee: Comar, LLC, Buena, NJ (US)

( * ) Notice: Subject to any disclaimer, the term of this patent is extended or adjusted under 35 U.S.C. 154(b) by 1110 days.

(21) Appl. No.: 12/504,493

(22) Filed: Jul. 16, 2009

(65) Prior Publication Data

US 2011/0012293 A1 Jan. 20, 2011

(51) Int. Cl.
*B29C 49/06* (2006.01)
*B29C 45/27* (2006.01)

(52) U.S. Cl.
CPC ............... *B29C 45/27* (2013.01); *B29C 49/06* (2013.01); *B29C 45/2711* (2013.01); *B29C 2045/2759* (2013.01)
USPC .......................................... 425/533; 425/549

(58) Field of Classification Search
USPC .................... 425/533, 547, 548, 549, 564
See application file for complete search history.

(56) References Cited

U.S. PATENT DOCUMENTS

| | | | | |
|---|---|---|---|---|
| 4,318,686 A | * | 3/1982 | Morgan | 425/543 |
| 2003/0072833 A1 | * | 4/2003 | Olaru | 425/549 |
| 2004/0208949 A1 | * | 10/2004 | Niewels | 425/549 |

* cited by examiner

*Primary Examiner* — Tim Heitbrink
(74) *Attorney, Agent, or Firm* — Montgomery, McCracken, Walker & Rhoads, LLP; James L. Gannon, II

(57) ABSTRACT

A system for producing blow molded articles. The system includes an injector nozzle mounted to a parison cavity block having a parison cavity such that the injector nozzle injects molten plastic into the parison cavity to form a parison. The injector nozzle is mounted to the parison block by means of two seats, a distal seat where the distal end of the injector nozzle is seated within an opening in the parison cavity block and a proximal seat, a linear distance inwardly from the distal seat, where a circular flange on the injector nozzle is seated within an annular shelf formed in the parison block. The two spaced apart seats ensure an accurate alignment between the centerline of the injector nozzle and the parison cavity. As a further feature, there is a system to heat the nozzle tip to reduce the temperature differential between the nozzle and the parison cavity.

12 Claims, 4 Drawing Sheets

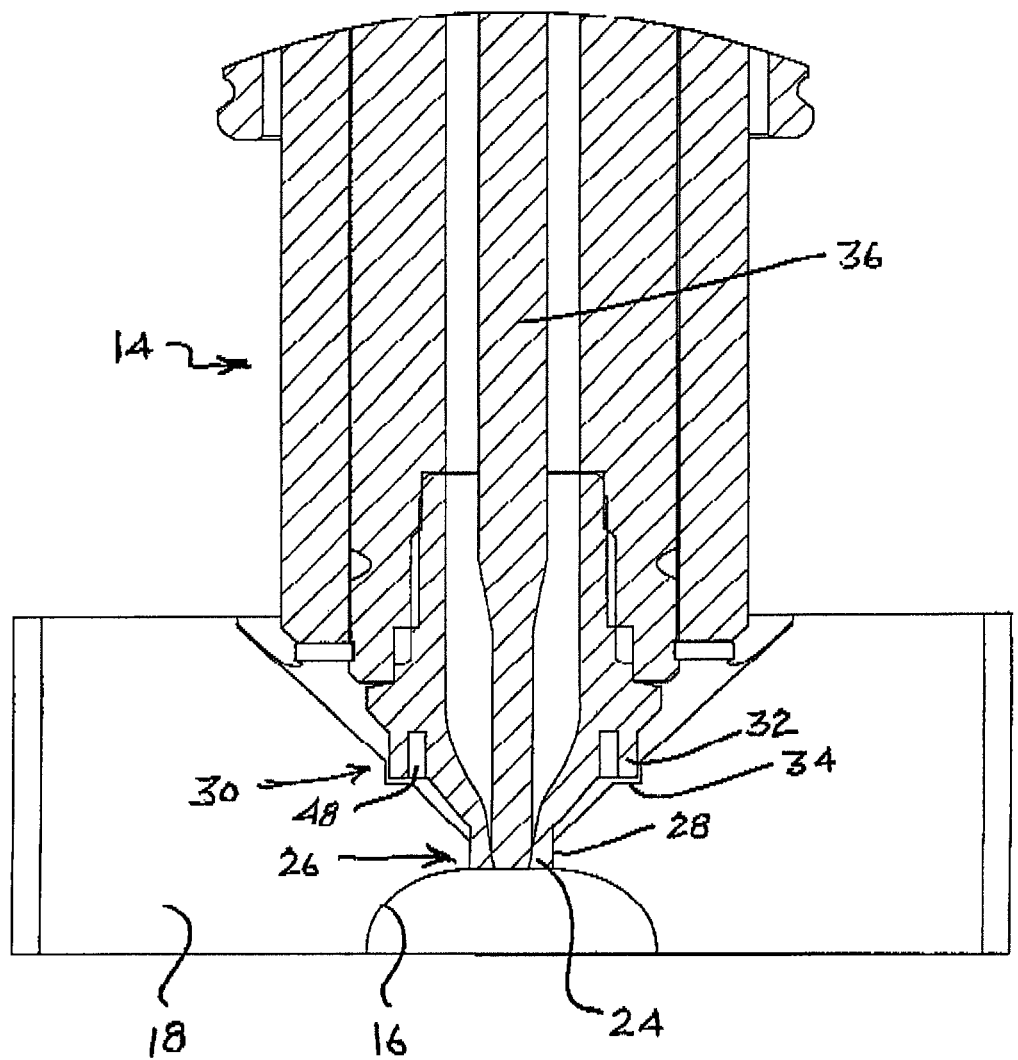

INJECTION BLOW MOLD MANIFOLD AND NOZZLE

TECHNICAL FIELD

The present invention relates generally to injection blow molding systems and, in particular, to an injection molding system and method that results in an improved parison produced thereby.

BACKGROUND

Injection Blow Molding (IBM) is well known as a manufacturing process for making hollow plastic parts. Typically, small plastic pellets or granules are melted into a liquid, the molten liquid passed through a nozzle, and then formed into a parison or hollow tube in a parison cavity. The parison is then transferred to a blow mold consisting of two clamped mold halves where the parison is inflated until it expands to fill the shape of the mold. The mold halves are then unclamped and the blow molded piece is removed.

One important consideration in an IBM system is ensuring that the centerline of the injector nozzle that injects the molten plastic and the centerline of parison cavity that receives the molten plastic are aligned. Numerous conditions cause the misalignment of these centerlines. For example, because the parison cavity and the nozzle are often operating at drastically different temperatures (sometimes as high as a 300 degree F. difference), the nozzle and parison cavity are often expanding at different rates and therefore their centerlines are moving at different rates thus causing misalignment. That temperature difference between the injector nozzle tip and the parison cavity also causes the nozzle tip to cool slightly and solidify plastic prematurely.

Thus, conventionally, the parison cavity is at one temperature and the injector nozzle is at another, cooler, temperature and therefore different thermal expansions cause the plastic material to leak out of the cavity and create a pool of liquid between the parison cavity block and the injector nozzle.

Not only does the temperature difference create a misalignment of the centerlines but also the actual alignment and assembly of the nozzle to the parison cavity can create a misalignment. In other words, the actual construction of the system in mounting the injector nozzle to the parison cavity is not sufficiently rigid and robust and a misalignment of the centerlines can occur. It is difficult to mount the injector nozzle and the parison cavity in the proper orientation in a robust manner that ensures the proper alignment of the respective axes.

Misalignment of the nozzle and parison cavity centerlines is disadvantageous for a variety of reasons. For example, misalignment causes leakage to occur between the nozzle and the parison cavity. Leakage of the molten plastic can cause machine stoppage (thus stopping production) and even machine destruction. Further, excessive nozzle replacement also occurs when there is excessive leakage. Misalignment of the centerlines also results in inconsistent cavity balance and fill rates. Cavity balance and fill rates are important in producing products of exacting specifications. Stated differently, inconsistent cavity balance and fill rates lead to molded pieces with varying weight and cosmetics leading to molded pieces that are not made to specification. In sum, misalignment of the centerlines costs time and money.

Accordingly, it would be advantageous to provide an IBM system and method of using the system that reduces the temperature differential between the injector nozzle and the parison cavity to better assure that the centerline of the injector nozzle and the parison cavity is maintained in light of thermal expansion and other variables. In addition, it would be advantageous to provide a means of mounting the injector nozzle to the parison cavity in a manner that the alignment of the centerline of the injector nozzle and the parison cavity is assured.

SUMMARY OF THE INVENTION

In one embodiment of the present invention, there is an injector nozzle that has two seating surfaces provided thereon such that there is a distal seating surface located at the distal end of the injector nozzle and a proximal seating surface displaced a linear distance away from the distal seating surface. In an exemplary embodiment, the distal and proximal seating surfaces are both cylindrical with the distal seating surface having a diameter smaller than the diameter of the proximal seating surface. In this manner, the proximal seating surface protects the distal seating surface from misalignment and the damaging chopping effect of a split part line shutoff.

In another embodiment of the present invention, there is an injection blow molding system that includes an injector nozzle that is heated such the temperature of the injection nozzle can be the same or close to the temperature of the parison cavity to alleviate the issue of a misalignment of the centerlines of the injector nozzle and the parison cavity due to the temperature differential between those components. In this exemplary embodiment, the temperature of the injector nozzle can be controlled by using a restrictor plate that surrounds and is in a heat conducting relationship with the injector nozzle. As such, by controlling the temperature of the restrictor plate by a heating system, the temperature of the injector nozzle is controlled since the restrictor plate is in a heat conducting relationship with the injector nozzle. In one embodiment, the heating system can be a heated liquid that is passed through the restrictor plate.

In another exemplary embodiment of the present invention, there is an injection blow molding system that includes an injector nozzle that has two seating surfaces that seat against two corresponding openings in a parison cavity block. As such, two seats are formed with one of the seats being formed at the distal end of the injector nozzle and the other a linear distance inwardly therefrom. By the use of the two seats, separated by a linear distance, the alignment is mechanically assured between the centerline of the injector nozzle and the parison cavity.

In this exemplary embodiment, the seats are formed by mating cylindrical surfaces on the injector nozzle with cylindrical openings in the parison cavity block with the diameter of the seat being formed at the distal end of the injector nozzle is smaller than the diameter of the proximal seat.

Finally in a further exemplary embodiment, there is a method of mounting the injector nozzle to the parison cavity block that creates the two seats as the combination is assembled during parison production.

Other features of the present injection blow molding system and method of making and using the same will become more apparent in light of the following detailed description of a preferred embodiment thereof and as illustrated in the accompanying drawings.

BRIEF DESCRIPTION OF THE DRAWINGS

FIG. 4 is a cross sectional view of an injector nozzle mounted to a parison cavity.

DETAILED DESCRIPTION OF ILLUSTRATIVE EMBODIMENTS

Figure 1:
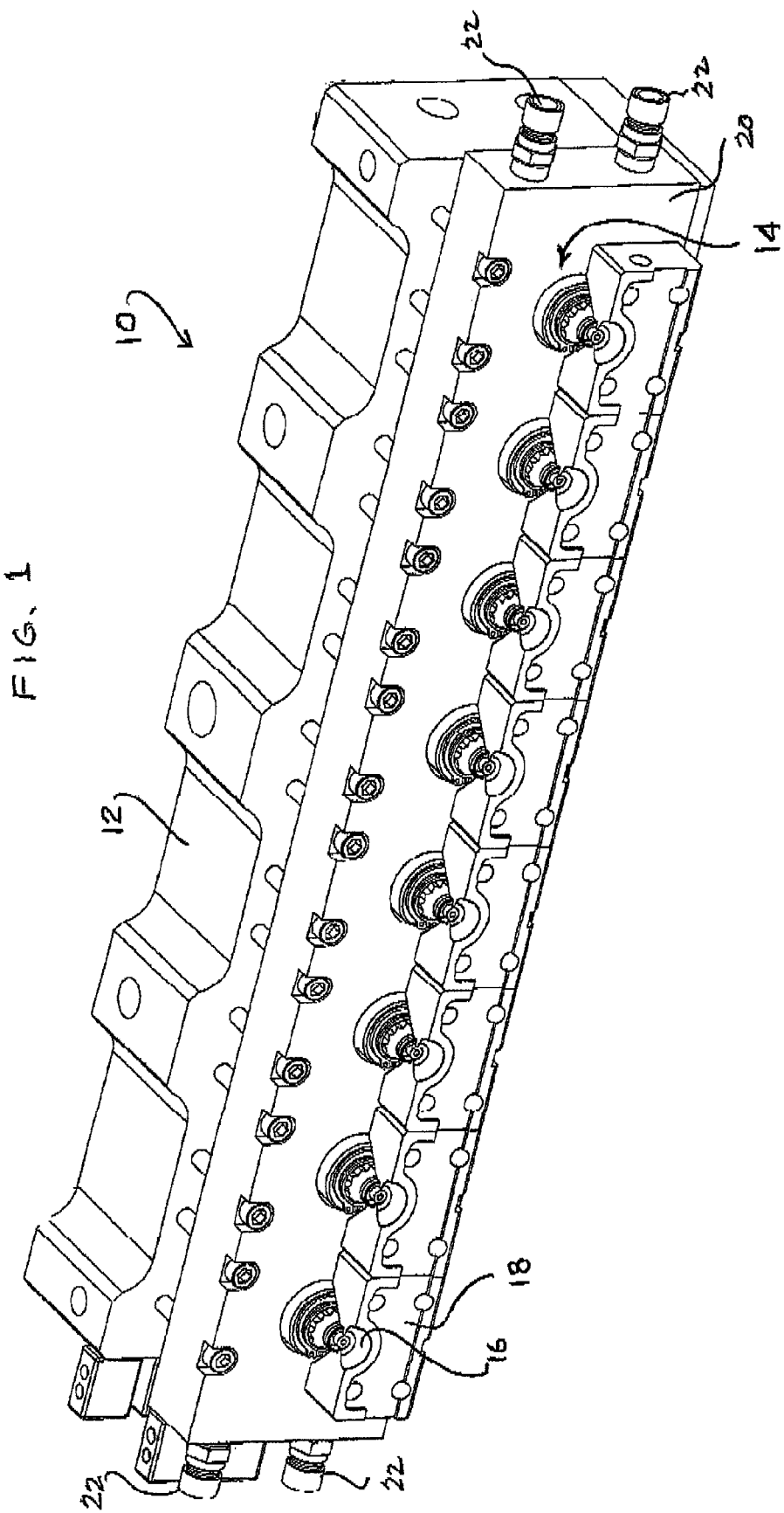
FIG. 1 is a perspective view, partially cut away, showing an eight cavity injection molding system utilizing the present invention.

Taking first, FIG. 1, there is shown a perspective view illustrating an eight cavity injection molding system 10. As can be seen, the system 10 includes a manifold 12 that is conventional in construction and which receives the molten plastic to guide that molten plastic into the injector nozzles 14 to be injected into the parison cavities 16 formed in parison cavity blocks 18. In the exemplary embodiment of FIG. 1, there are eight parison cavities 16 such that eight parisons can be produced with a single injection of molten plastic, it being understood that a lesser or greater number of parison cavities may be employed consistent with the present invention.

As can be seen, the parson cavities 16 are shown with portions removed in order to illustrate the present invention, it being understood that each parison cavity 16 normally is an enclosed cavity that receives the molten plastic to form a parison. The manifold 12 is a conventional manifold used for injection blow molding having an input of molten plastic so as to distribute the molten plastic equally to each of the parison cavities 16 to create parisons having equal dimensions.

In one embodiment of the present invention, there is a restrictor plate 20 positioned between the manifold 12 and the parison cavities 16 through which the injector nozzles 14 pass for injecting the molten plastic into the parison cavities 16. The restrictor plate 20 has connectors 22 at both ends thereof for the passage of a heated liquid. The heated liquid passing through the restrictor plate 20 controls the temperature of the restrictor plate 20 in order to retain that restrictor plate 20 at an elevated temperature.

Accordingly, as previously explained, one reason for the misalignment of the centerline line of the injector nozzle 14 with the centerline of a parison cavity 16 is due to the differential temperature between those components. The parison cavity block 18 is normally heated by the injection of hot, molten plastic into the parison cavity 16 during the injection process and, as a result, the temperature of the parison cavities 16 are at an elevated temperature whereas the restrictor plate 20 is normally at a lower temperature.

Thus, with the circulation of a heated liquid at a predetermined temperature, the temperature of the restrictor plate 20 itself can be controlled to be at or close to the temperature of the parison cavity 16 and parison cavity block 18 and, therefore, the normal heat transfer between the restrictor plate 20 and the injector nozzle 14 elevates the temperature of the injector nozzle 14 accordingly. Therefore, the issue of the centerline of the injector nozzle 14 and the centerline of the parison cavity 16 being misaligned due to the temperature differential is reduced.

Figure 2:
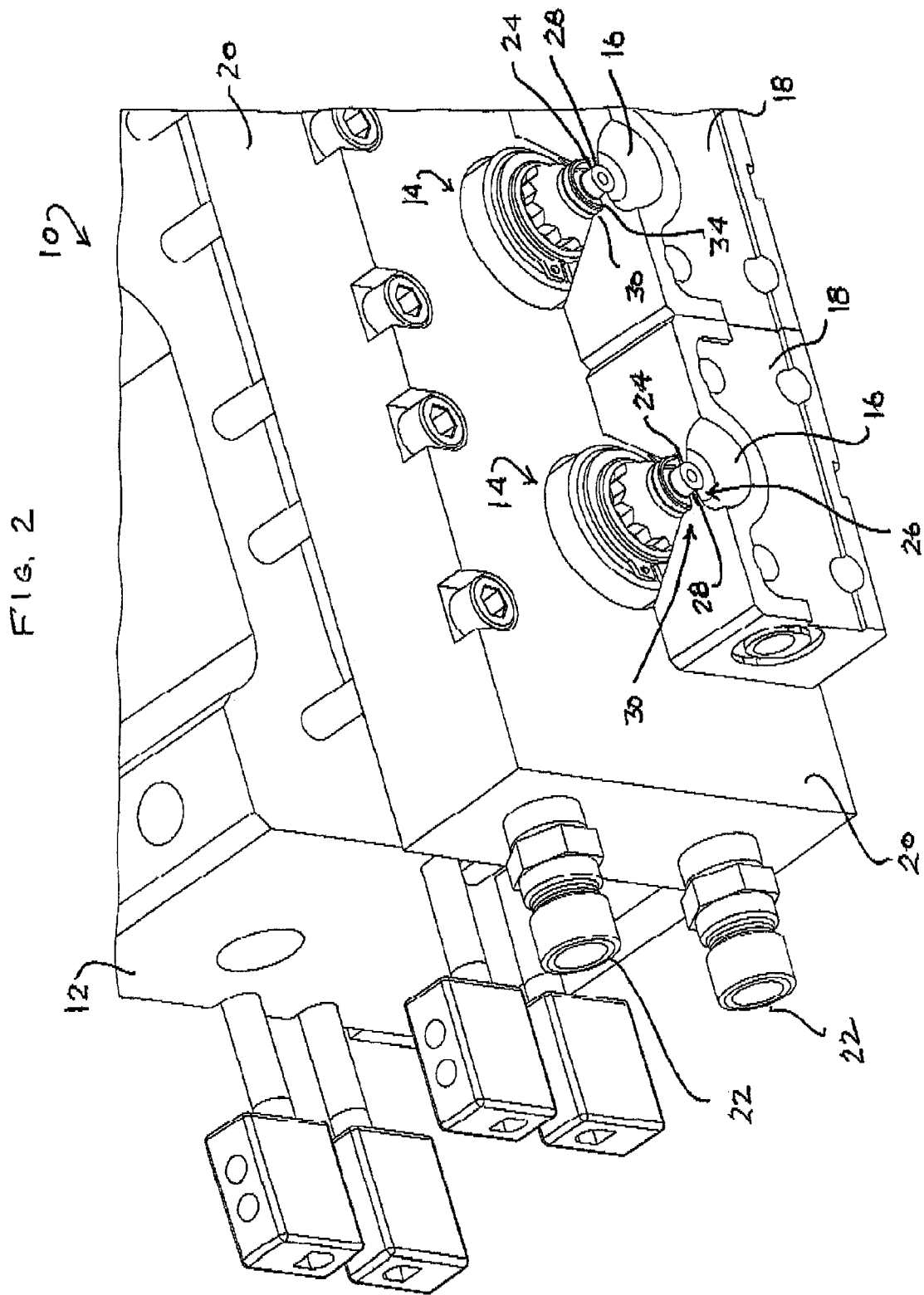
FIG. 2 is an enlarged perspective view, partially cut away, showing a portion of the system of FIG. 1.

Turning now to FIG. 2, there is shown a perspective view, partially broken away, illustrating the construction of the injector nozzles 14 with respect to the parison cavities 16 and parison cavity blocks 18. In FIG. 2, it can be seen that the distal end 24 of the injector nozzle 14 has a circular seating surface that enters the parison cavity 16 and a distal seat 26 is created by the cylindrical seating surface of the distal end 22 of the injector nozzle 14 passing through an opening 28 in the parison cavity block 18 thereby seating the injector nozzle 14 aligned with the parison cavity 16.

A proximal seat 30 is also created by a circular flange 32 (FIGS. 3 and 4) formed on the injector nozzle 14 that has a circular seating surface that seats with an annular shelf 34 formed in the parison cavity block 18.

As such, it can be seen that the alignment and orientation of the injection nozzle 14 with the parison cavity 16 is carried out by the use of two seats, a distal seat 26 and a proximal seat 30 that are separated by a linear distance. As also can be seen, the diameter of the distal seat 26 is smaller than the diameter of the proximal seat 30. As will become clear, the combination of the two seats, separated by a linear distance, ensures that the centerline of the injector nozzle 14 is correctly aligned with the centerline of the parison cavity 16.

Figure 3:
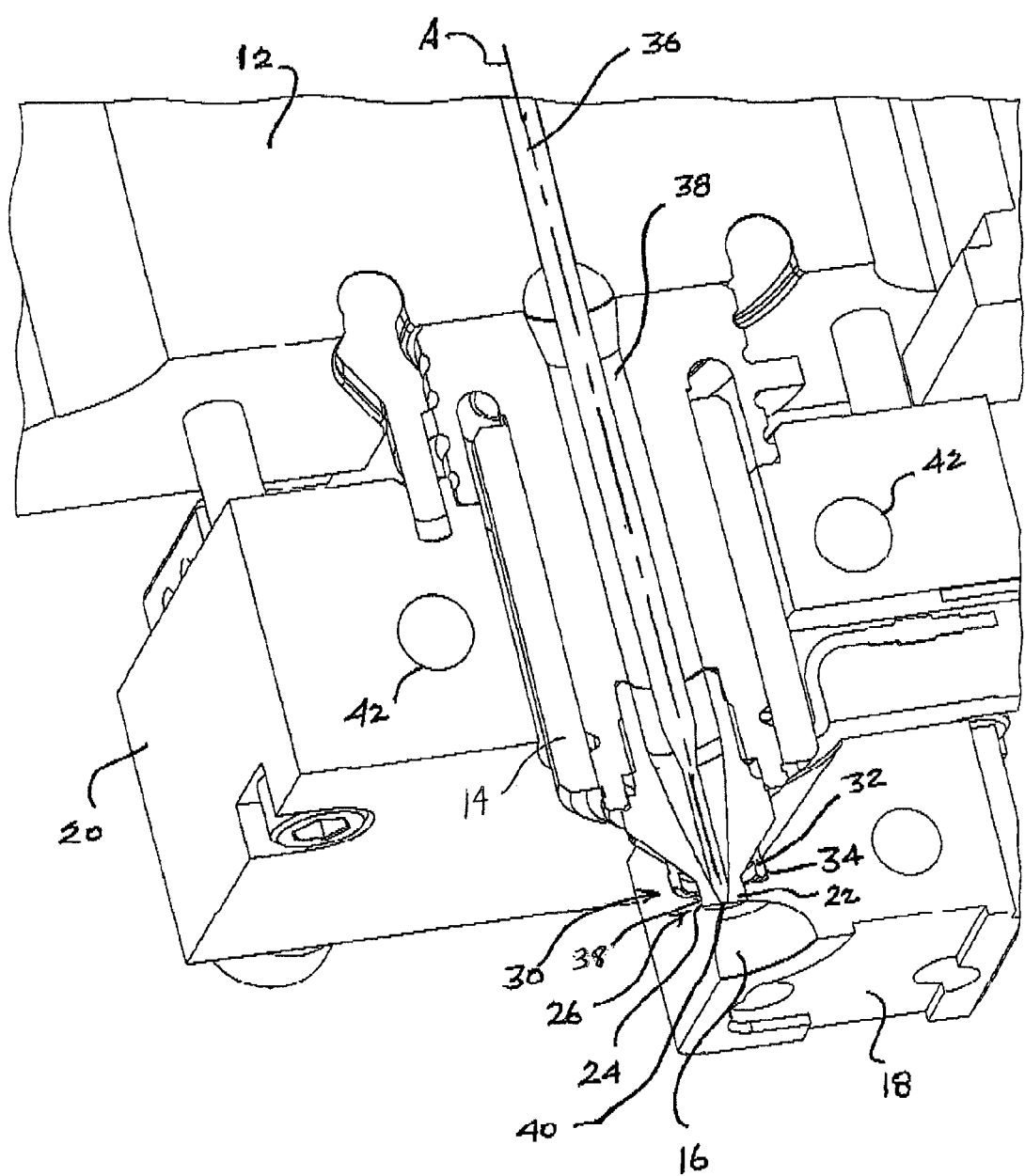
FIG. 3 is an enlarged, perspective view, partially cut away, showing the mounting of an injector nozzle to a parison cavity in accordance with the present invention.

Turning now to FIG. 3, there is a perspective view, partly broken away, showing the mounting of the injector nozzle 14 to a parison cavity block 18. As can be seen, the injector nozzle 14 has a conventional nozzle pin 36 that is movably mounted within a bore 38 where the molten plastic flows and the nozzle pin 36 opens and closes at the distal end 22 of the injector nozzle 14 to prevent and to allow the injection of molten plastic from the bore 38 thereof through the injector opening 40 and into the parison cavity 16. In FIG. 3, the distal and proximal seats 26, 30 can be seen, that is, the distal seat 26 is created by the cylindrical distal end 24 of the injector nozzle 14 passing through and seated within the opening 28 in the parison block 28 to stabilize the distal end 22 with respect to the parison cavity 16.

The proximal seat 30 is created by the circular flange 32 of the injector nozzle 14 entering into and seating against the annular shelf 34 also formed in the parison cavity block 18. Since the distal end 24 of the injector nozzle 14 and the circular flange 32 are machined during the manufacture of the injector nozzle 14, both of those circular surfaces are accurately aligned with the centerline A of the injector nozzle 14.

In a similar manner, since the opening 28 in the parison cavity block 18 is also machined during the manufacture of the parison cavity 16, that opening 28 is aligned with the centerline of the parison cavity 16. As such, there is assurance that when both the distal seat 26 and proximal seat 30 are properly seated, the centerline of the injector nozzle 14 is accurately aligned with the centerline of the parison cavity 16.

As can further be seen in FIG. 3, there are passageways 42 that pass through the restrictor plate 20 to carry the heated liquid from one connector 22 (FIG. 2) to another in circulating the heated liquid through the restrictor plate 20.

Turning finally to FIG. 4, there is a cross sectional view of the injector nozzle 14 mounted to the parison cavity block 18. As can be seen, the distal seat 26 is formed through the entry of the cylindrical distal end 24 of the injector nozzle 14 into the opening 28 in the parison cavity block 18. Likewise, the proximal seat 30 is formed by entry of the annular flange 32 of the injector nozzle 14 into the annular shelf 34 formed in the parison cavity block 18. That annular shelf 34 is formed in the interior of the conical shaped entrance 46 tapering inwardly in toward the opening 28 in the parison cavity block 18 so that the injector nozzle 14 fits partially within the conical shaped entrance 46.

As also can be seen in FIG. 4, there is an annular air gap 48 that insulates the conduction of heat between the main body of the injector nozzle and the outer cylindrical surface of the circular flange 32 such that the temperature of the circular flange 32 is cooler than the main body of the injector nozzle 14.

Those skilled in the art will readily recognize numerous adaptations and modifications which can be made to the injection blow molding system of the present invention which will result in an improved system yet all of which will fall within the scope and spirit of the present invention as defined in the following claims. Accordingly, the invention is to be limited only by the following claims and their equivalents.

What is claimed:

1. An injection blow molding nozzle for injecting a liquid comprising:
    an injector nozzle having
        a central axis,
        a bore for containing the liquid,
        a distal end having a controllable opening,
        a valve pin movably located in the bore of the injector nozzle to control the flow of a liquid through the distal end,
        a first cylindrical seating surface formed at the distal end, the first cylindrical seating surface being located on an outer surface of the nozzle, the first cylindrical seating surface being parallel to and having a central axis that is coincident with the central axis of the nozzle, and
        a second seating surface formed inwardly of the distal end, wherein the second seating surface comprises:
            a circular flange having a cylindrical surface located on a radially outer surface of the nozzle, the cylindrical surface being parallel to and having a central axis that is coincident with the central axis of the nozzle, and
            an annular gap located radially inward from the circular flange at a location between the cylindrical surface of the second seating surface and the bore, the gap configured to insulate against the conduction of heat from the bore to the cylindrical surface of the circular flange.

2. The nozzle of claim 1 wherein the first seating surface and second seating surface are cylindrical surfaces.

3. The nozzle of claim 1 wherein the second seating surface has a diameter that is larger than the diameter of the first seating surface.

4. The nozzle of claim 1 wherein the first seating surface surrounds the controllable opening of the injector nozzle.

5. An injection blow molding system comprising:
    an injector nozzle having a bore,
        a distal end,
        a centerline, and
        at least one seating surface formed thereon;
    a restrictor plate for aligning the centerline of the injector nozzle with a centerline of a parison cavity, the restrictor plate being separate from the parison cavity and positioned about a portion of the injector nozzle; and
    a heating system to control the temperature of the restrictor plate so as to reduce a temperature and/or expansion differential between the injector nozzle and the parison cavity in order to maintain the alignment of the centerline of the injector nozzle with the centerline of the parison cavity.

6. The injection blow molding system of claim 5 wherein the heating system comprises at least one passageway formed within the restrictor plate for passing a heated liquid therethrough.

7. An injection blow molding system comprising:
    an injector nozzle having
        a central axis,
        a bore,
        a distal end,
        a first cylindrical seating surface formed at the distal end, the first cylindrical seating surface being located on an outer surface of the nozzle, the first cylindrical seating surface being parallel to and having a central axis that is coincident with the central axis of the nozzle,
        a second seating surface formed inwardly of the distal end, wherein the second seating surface comprises:
            a circular flange having a cylindrical surface located on a radially outer surface of the nozzle, the cylindrical surface being parallel to and having a central axis that is coincident with the central axis of the nozzle, and
            an annular gap located radially inward from the circular flange at a location between the cylindrical surface of the second seating surface and the bore, the gap configured to insulate against the conduction of heat from the bore to the cylindrical surface of the circular flange; and
    a parison cavity block having
        a parison cavity formed therein for receiving the injector nozzle,
        a first opening for receiving the first seating surface, and
        a second opening for receiving the second seating surface.

8. The injection molding system of claim 7 wherein the first seating surface and second seating surface are cylindrical surfaces.

9. The injection molding system of claim 7 wherein the diameter of the second seating surface is larger than the diameter of the first seating surface.

10. The injection molding system of claim 7 wherein the parison cavity block has a conical shaped entrance for receiving the injector nozzle.

11. The injection molding system of claim 9 wherein the second opening for receiving the second seating surface comprises a annular shelf formed on the inside surface of the conical shaped entrance to the parison cavity block.

12. The injection molding system of claim 7 wherein the temperature of the circular flange is lower than the temperature of the injector nozzle.

* * * * *